United States Patent [19]

Fleischfresser et al.

[11] 4,410,982

[45] Oct. 18, 1983

[54] ARRANGEMENT FOR EXTENDING DIGITAL SIGNALING TO TELEPHONE SUBSCRIBERS' SUBSTATIONS

[75] Inventors: Gerald H. Fleischfresser, Wheaton; Alex W. Kobylar, Chicago, both of Ill.

[73] Assignee: GTE Automatic Electric Labs. Inc., Northlake, Ill.

[21] Appl. No.: 261,405

[22] Filed: May 7, 1981

[51] Int. Cl.³ .............................................. H04J 3/12
[52] U.S. Cl. ............................. 370/110.1; 370/110.2; 179/84 R
[58] Field of Search .................... 179/18 ES, 77, 81 R, 179/2.51, 84 R; 370/110.1, 110.2, 58, 79, 56

[56] References Cited

U.S. PATENT DOCUMENTS 3,922,493 11/1975 Brenig et al. ..................... 370/110.1
4,197,432 4/1980 Tiedt ..................................... 179/77
4,232,199 11/1980 Boatwright et al. ........... 179/18 ES
4,281,410 7/1981 Apricola et al. ................ 370/110.1
4,317,962 3/1982 Cox et al. ........................ 370/110.1
4,345,115 8/1982 Sweet ................................ 179/81 R
4,354,264 10/1982 Wurst .............................. 370/110.1

Primary Examiner—Gerald L. Brigance
Attorney, Agent, or Firm—Gregory G. Hendricks; Robert J. Black

[57] ABSTRACT

A centrally located digital multiplexer distributes T1 digital signals between a digital central office and a plurality of subscriber service circuits each located at a corresponding subscriber's premises. The subscriber service circuits provide digital signaling and analog line supervision. Analog power supplies and signal generators are connected to the subscriber service units under control of a centrally located microprocessor which communicates with the central office via a dedicated channel in the digital multiplexer.

7 Claims, 2 Drawing Figures

ARRANGEMENT FOR EXTENDING DIGITAL SIGNALING TO TELEPHONE SUBSCRIBERS' SUBSTATIONS

BACKGROUND OF THE INVENTION

1. Field of the Invention

The present invention relates to digital telephone signaling and more particularly to a method for providing telephone subscribers with digital service.

2. Description of the Prior Art

Analog telephone lines do not use active logic at the subscriber substation and thus need power only for the telephone instrument itself. Digital supervisory signaling however requires power at the subscriber's substation at all times in order to transmit on-hook and off-hook status and in order to recognize and respond to a ring command. Thus for digital signaling power must always be presented to the line.

One approach to this problem would be to provide digital line circuits at the subscriber's premises along with analog ringers and howlers. However, this solution is expensive both in terms of circuitry and power drain.

Accordingly, it is the object of the present invention to provide a novel arrangement for extending digital service to the subscriber's premises without the requirement of digital telephones, complex digital line circuits or excessive power requirements.

SUMMARY OF THE INVENTION

The present invention provides an arrangement for extending digital telephone signaling from a digital telephone office to the telephone subscriber's premises. The analog-digital conversion circuitry is located at the subscriber's premises and is designated as the subscriber service unit. The loop status detection circuits, power supplies, signal generators, microprocessor and digital multiplexer are centrally located and are designated as a pedestal circuit.

The microprocessor responds to commands from the digital telephone office via a dedicated multiplexer channel to apply low voltage line supervision battery, high voltage talking battery, a ringing signal or a howler signal to the subscriber service unit. These signals bypass the analog-digital conversion circuitry and are applied directly to the subscriber station.

The subscriber service unit normally is connected to the low voltage line supervision power supply which is insufficient to power the analog-digital conversion circuitry and thus eliminates on-hook power drain. Upon detection of an off-hook condition, the microprocessor applies the high voltage talking battery to the subscriber service unit. This high voltage is detected by a power regulator in the subscriber service unit which then applies power to the analog-digital conversion circuitry. The subscriber substation then uses digital signaling to communicate with the central office, via a digital multiplexer.

DESCRIPTION OF THE PREFERRED EMBODIMENT

Figure 1:
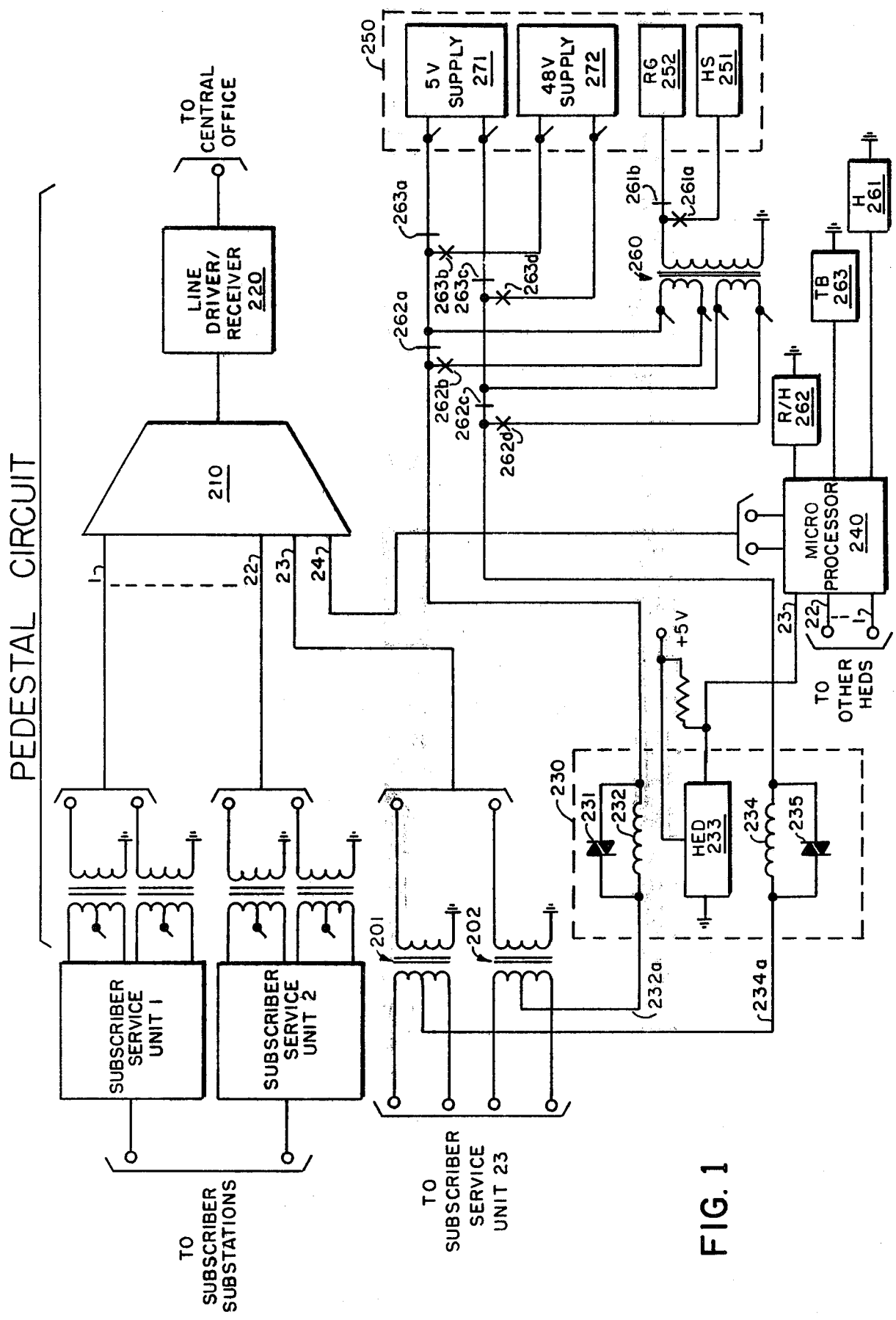
FIG. 1 of the accompanying drawing is a combined schematic and block diagram of an arrangement for providing digital telephone service to telephone subscriber's substations in accordance with the present invention.

Referring now to the FIG. 1, the arrangement for providing digital telephone service to telephone subscriber's substations of the present invention, is shown connected between a digital central office and a plurality of subscriber substations.

Figure 2:
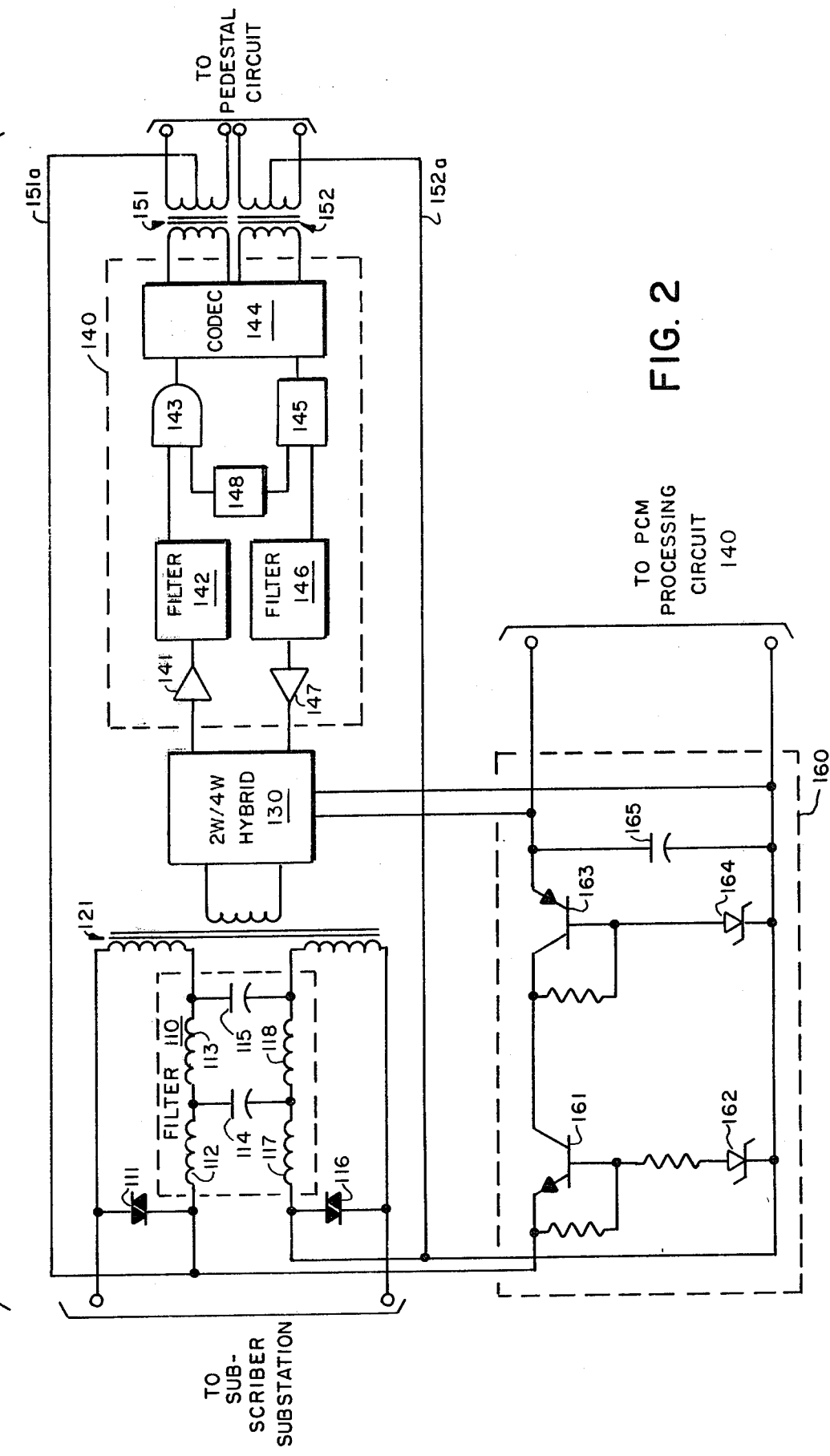
FIG. 2 of the accompanying drawing is a combined schematic and block diagram of subscriber service unit 23 of FIG. 1.

The subscriber service units are shown connected between a subscriber substation and a pedestal circuit which is connected to the central office. Referring now to FIG. 2, the subscriber service unit includes transformer 121 connected between filter 110 and hybrid 130 which is connected to pulse code modulation (PCM) circuit 140. Voltage regulator 160 is shown connected to filter 110, hybrid 130 and PCM processing circuit 140.

Filter 110 eliminates line noise picked up on battery feed path 151a and 152a between the pedestal circuit and the subscriber service unit. The subscriber's voice frequency signal is coupled to hybrid 130 via transformer 121. Hybrid 130 converts this two-wire signal from the subscriber substation to a four-wire signal for use by PCM processing circuit 140. The transmit path of PCM processing circuit 140 includes amplifier 141, filter 142, gating circuit 143 and codec 144. Amplifier 141 and filter 142 operate to present signals of sufficient magnitude and resolution to gate 143 to allow it to convert these analog signals into pulse amplitude modulated (PAM) signals, i.e. gate 143 generates periodic signals representative of the amplitude of the incoming analog signal under control of clock 148. Codec 144 converts each PAM signal into a PCM signal by generating a binary coded signal representative of each PAM signal that it receives. Codec 144, register 145, filter 146 and amplifier 147 operate similarly to perform the reverse function, i.e., convert the PCM signals used in the pedestal circuit to the analog signals used in the subscriber substation.

Regulator 160 supplies power to hybrid 130 and PCM processing circuit 140. This regulator includes switching transistor 161 and zener diode 162 connected in parallel with regulating transistor 163, zener diode 164 and capacitor 165. When a voltage in excess of five volts appears across zener diode 162 switching transistor 161 turns on and regulating transistor 163, zener diode 164 and capacitor 165 operate to provide regulated five volt power to hybrid 130 and PCM processing circuit 140.

The pedestal circuit includes a digital multiplexer 210 connected to a digital central office via line driver/receiver 220. One of the channels of digital multiplexer 210 is connected to microprocessor 240 while the other channels are connected to subscriber service units via coupling transformers with phantom power leads. The phantom power leads of coupling transformers 201 and 202 are connected to coil 234 and 232 respectively. These coils are connected to power and signal circuit 250 which is also connected to microprocessor 240. Hall effect device 233 is connected in magnetic field proximity to coils 232 and 234 and it is electrically connected to microprocessor 240.

Microprocessor 240 receives digital commands from the central office via channel 24 of digital multiplexer 210 and it also transmits status signals to the central office via this channel. Microprocessor 240 also monitors the loop status of each subscriber station connected to a subscriber service unit via the Hall effect device associated with each subscriber service unit. Application of power supply and signal generators to selected subscriber service units is also controlled by microprocessor 240 through operation of power supply, ringer and howler relays.

When the subscriber substation associated with subscriber service unit 23 is idle, microprocessor 240 does not operate power relay 263 therefore five volt power supply 271 is connected to subscriber service unit 23 via coils 232 and 234, phantom power leads 232A and 234A and coupling transformers 201 and 202. This power signal bypasses PCM processing circuit 140, hybrid 130, transformer 121 and filter 110 via phantom derived power leads 151a and 152a. Thus the five volt power supply is applied to the subscriber substation for supervisory signaling without any power loss in the subscriber service unit.

When the subscriber station goes off-hook, a loop is closed via the phantom power leads and coils 232 and 234 to five volt power supply 271. The resultant current flowing through coils 232 and 234 generates a magnetic flux which is detected by Hall effect device 233. This device then generates an off-hook signal to microprocessor 240. In response to this signal, microprocessor 240 operates talking battery relay 263 which connects 48 volt power supply 272 to the phantom power leads and disconnects five volt power supply 271.

Regulator 160 responds to detection of the 48 volt talking battery by providing a regulated five volt power signal to hybrid 130 and PCM processing circuit 140. Since the 48 volt power supply is sufficient to turn on zener diode 162, switching transistor 161 turns on and enables regulating transistor 163 to provide the regulated power output to hybrid 130 and PCM processing circuit 140. Since hybrid 130 and PCM processing circuit 140 are powered up in response to talking battery the voice frequency signals from the subscriber station, as filtered by filter 110, can be converted to a four-wire signal by hybrid 130 and to digital format by PCM processing circuit 140. This digital signal is then coupled to digital multiplexer 210 by transmit coupling transformer 201. Digital multiplexer 210 then transmits this signal to the central office via line driver/receiver 220.

Similarly digital voice signals are received from the central office via line driver/receiver 220 and digital multiplexor 210 and coupled to appropriate subscriber service unit by receive coupling transformer 202. PCM processing circuit 140 converts this signal to analog format and hybrid 130 converts this four-wire signal to two-wire format for transfer to the subscriber substation. When the subscriber station goes back on-hook Hall effect device 233 detects the absence of loop current and generates an on-hook signal. Microprocessor 240 responds to this on-hook signal by releasing talking battery relay 263, thereby disconnecting 48 volt supply 272 and reconnecting five volt supply 271 for idle line supervision.

In order to ring a particular subscriber substation, the central office transmits a ringing command to microprocessor 240 via channel 24 of digital multiplexer 210. Microprocessor 240 then operates ringer/howler relay 262 which causes ringing generator 252 to be coupled to phantom derived leads 232A and 234A via coupling transformer 260. Thus the ringing voltage is modulated on top of the low voltage line supervision battery from five volt power supply 271. This configuration provides ringing to the subscriber substation and still supplies the necessary voltage for answer supervision. Varistors 231, 235, 111 and 116 operate as high level bypass devices for Hall effect device 233 and filter 110.

When the subscriber station answers the call by going off-hook Hall effect device 233 again recognizes the magnetic flux generated by coils 232 and 234 in response to loop current. In response to the off-hook signal from Hall effect device 233 microprocessor 240 releases ringer/howler relay 262, thereby disconnecting ringing generator 252 from the phantom leads. It also operates talking battery relay 263 in order to connect 48 volt power supply 272 to the subscriber service unit via the phantom leads. As a result operating power is supplied to hybrid 130 and PCM processing circuit 140 via regulator 160, for digital communication with the central office via digital multiplexer 210.

If the subscribers handset remains off-hook without completion of dialing for a pre-determined time, the central office will send a message to microprocessor 240 via channel 24 of digital multiplexer 210 to connect a howler to the subscriber substation. Microprocessor 240 responds to this signal by operating ringer/howler relay 262 and howler relay 261 thereby connecting howler signal source 251 to the subscriber substation via coupling transformer 260 and the pantom power leads.

Thus the present invention extends digital telephone service to a subscriber substation through use of a subscriber service unit, located at the subscriber's premises, and a common pedestal circuit which is remotely located to provide common line supervisory and signaling functions. This digital subscriber service is accomplished without the use of a digital telephone, high power requirements or complex circuitry.

It will be obvious to those skilled in the art that numerous modifications of the present invention can be made without departing from the spirit of the invention which shall be limited only by the scope of the claims appended hereto.

What is claimed is:

1. An arrangement for extending digital signaling to telephone subscribers' substations including a digital switching system operated to generate a plurality of line alerting commands, a line signaling generator operated to generate line alerting signals, talking battery operated to generate a bias signal and a plurality of subscriber substations each operable to generate analog communication signals, said arrangement comprising;

a plurality of subscriber service circuits operated in response to connection to an associated one of said subscriber substations to generate an off-hook signal;

line supervision means connected to said subscriber service circuits operated in response to each of said off-hook signals to generate a digital off-hook detected signal, and further operated to connect said talking battery to each of said subscriber service circuits that generated an off-hook signal;

each of said subscriber service circuits operated in response to said talking battery and generation of said analog communication signals to generate digital communication signals; and a digital multiplexer connected between said switching system and said subscriber service circuits, operated to transmit said digital off-hook detected signals and said digital communication signals to said switching system;

said digital multiplexer further connected to said line supervision means, and further operated to transmit said line alerting commands to said line supervision means;

said line supervision means operated in response to each of said line alerting commands to connect said line signaling generator to an associated subscriber service circuit;

said subscriber service circuits operated to transmit said line alerting signal to said associated subscriber substation;

said subscriber service circuits comprising pulse code modulation means operated to convert said analog communication signals to said digital communication signals; and shunting means connected across said pulse code modulation means, operated to shunt said alerting signal from said pulse code modulation means.

2. The arrangement of claim 1, wherein said subscriber service circuits further comprise: regulation means connected between said shunting means and said pulse code modulation means, said shunting means further operated to shunt said bias signal from said pulse code modulation means and apply said bias signal to said regulation means, said regulation means operated in response to said bias signal to generate a regulated battery signal and apply said regulated battery signal to said pulse code modulation means.

3. The arrangement of claim 2, wherein said regulation means comprise: threshhold detection means operated to generate an enable signal upon detection of said bias signal; and voltage regulation connected to said threshhold detection means operated in response to said enable signal to generate said regulated battery signal.

4. The arrangement of claim 1, wherein said line supervision means comprise: a plurality of signal detection means each connected to an associated one of said subscriber service circuits, operated in response to said off-hook signals to generate off-hook detected signals; and processing means connected to said plurality of detection means operated in response to said off-hook detected signals to generate said digital off-hook detected signals, and further operated to connect said talking battery to said subscriber service circuits.

5. The arrangement of claim 4, wherein: said processing means are further connected to said digital multiplexer, and further operated in response to said line alerting commands to connect said line signaling generator to said subscriber service circuits.

6. The arrangement of claim 5, wherein: said processing means comprise a microprocessor.

7. The arrangement of claim 4, wherein said signal detection means comprise: magnetic flux generating means operated in response to said off-hook signal to generate a magnetic flux; and magnetic flux detection means connected in magnetic field proximity to said magnetic flux generating means operated in response to said magnetic flux to generate said off-hook detected signal.

* * * * *